(12) United States Patent
Aaltonen

(10) Patent No.: US 6,724,434 B1
(45) Date of Patent: Apr. 20, 2004

(54) INSERTING ONE OR MORE VIDEO PICTURES BY COMBINING ENCODED VIDEO DATA BEFORE DECODING

(75) Inventor: Janne Aaltonen, Turku (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/521,836

(22) Filed: Mar. 9, 2000

(30) Foreign Application Priority Data

Mar. 11, 1999 (FI) .................................................. 990537

(51) Int. Cl.$^7$ ................................................ H04N 5/45
(52) U.S. Cl. ........................ 348/565; 348/584; 348/598
(58) Field of Search ................................ 348/565–568, 348/581, 584, 598, 588; 325/240.24

(56) References Cited

U.S. PATENT DOCUMENTS

| | | | | |
|---|---|---|---|---|
| 5,504,528 A | * | 4/1996 | Koshiro et al. | 348/385 |
| 5,623,308 A | * | 4/1997 | Civanlar et al. | 348/392 |
| 5,633,683 A | * | 5/1997 | Rosengren et al. | 348/385 |
| 5,657,092 A | | 8/1997 | Kim | 348/565 |
| 5,815,216 A | | 9/1998 | Suh | 348/588 |
| 5,847,771 A | * | 12/1998 | Cloutier et al. | 348/564 |
| 5,995,146 A | * | 11/1999 | Rasmussen | 348/385 |
| 5,999,216 A | * | 12/1999 | Kaars | 348/385 |
| 6,041,068 A | * | 3/2000 | Rosengren et al. | 370/538 |
| 6,057,884 A | * | 5/2000 | Chen et al. | 375/240.16 |
| 6,167,084 A | * | 12/2000 | Wang et al. | 375/240.02 |
| 6,313,822 B1 | * | 11/2001 | McKay et al. | 345/132 |
| 6,356,313 B1 | * | 3/2002 | Champion et al. | 348/558 |
| 6,445,828 B1 | * | 9/2002 | Yim | 382/250 |

FOREIGN PATENT DOCUMENTS

| | | |
|---|---|---|
| EP | 0 661 888 A2 | 7/1995 |
| GB | 2310335 | 8/1997 |

OTHER PUBLICATIONS

Y. Noguchi et al., MPEG Video Compositing in the Compressed Domain, IEEE International Symposium on Circuits and Systems, Atlanta, GA, USA, May 12–15, 1996, pp. 596–599.

Chang et al., Manipulation and Compositing of MC–DCT Compressed Video, IEEE Journal on Selected Areas in Communications, New York, NY, USA, Jan. 13, 1995, pp. 1–11.

Chang et al., A New Approach to Decoding and Compositing Motion–Compensated DCT–Based Images, Proceedings of the International Conference on Acoustics, Speech, and Signal Processing (ICASSP), New York, NY, USA, Apr. 27, 1993, pp. 421–424.

Hu et al., Image/Video Spatial Scalability in Compressed Domain, IEEE Transactions on Industrial Electronics, New York, NY, USA, Feb. 1, 1998, pp. 23–31.

Natarajan et al., A Fast Approximate Algorithm for Scaling Down Digital Images in the DCT Domain, Proceedings of the International Conference on Image Processing (ICIP), Washington, DC, USA, Oct. 23–26, 1995, pp. 241–243.

* cited by examiner

*Primary Examiner*—Victor R. Kostak

(57) ABSTRACT

The invention relates to the insetting of a moving picture in a moving main picture when the picture signals are in an encoded digital format. The main idea is that the picture signals are combined prior to decoding. The frames of the picture to be inset are scaled down by reducing the number of macro blocks in them in such a manner that the picture whole is retained. The macro blocks of a certain area of the main picture are replaced by the macro blocks of the reduced picture and the combined video signal is decoded. The video signals (ES1, ES2) to be combined may be picked up from different sources or extracted from a transport stream where they are in packets. The system according to the invention requires only a single decoder (210), which considerably reduces the amount of computation required by the combination of the pictures. The advantage is emphasized if there are several pictures to be combined.

13 Claims, 3 Drawing Sheets

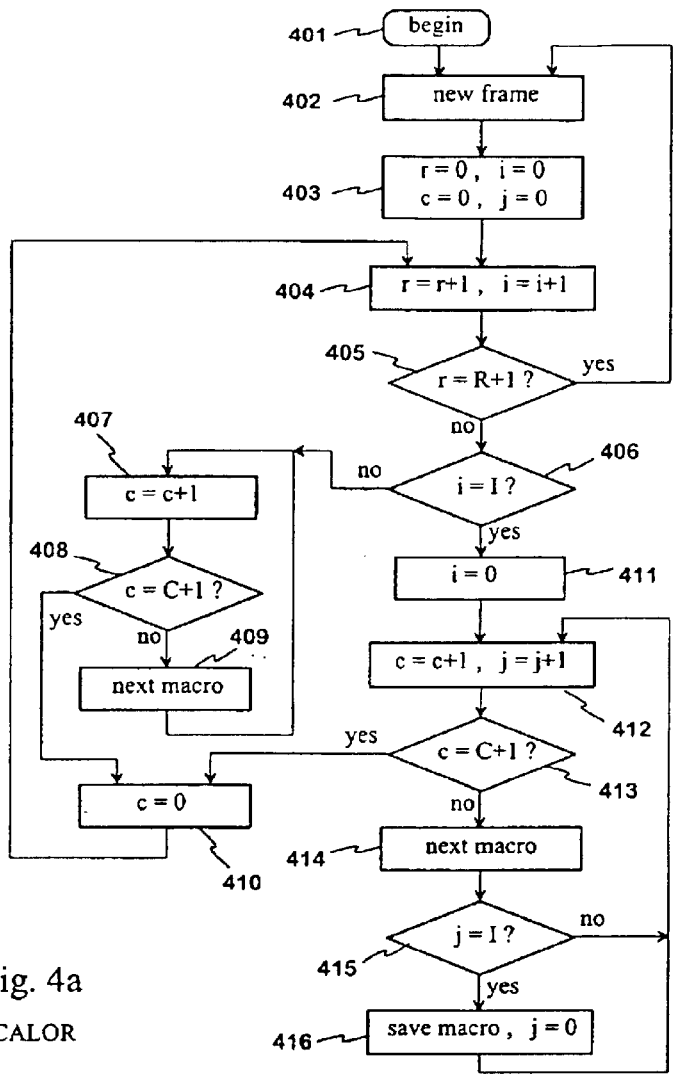
Fig. 4a  SCALOR
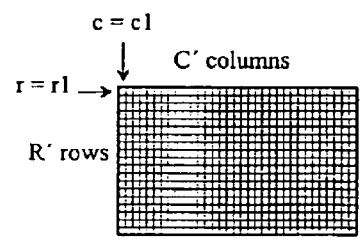
Fig. 4b  PIP
$R' = I[R/I]$
$C' = I[C/I]$
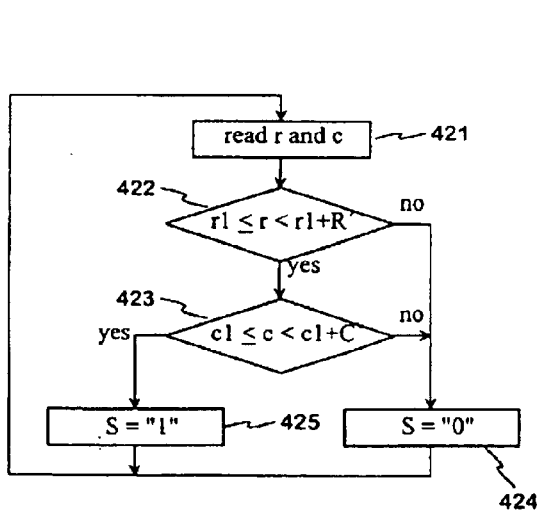
Fig. 4c  TIMER

INSERTING ONE OR MORE VIDEO PICTURES BY COMBINING ENCODED VIDEO DATA BEFORE DECODING

BACKGROUND OF THE INVENTION

1. Technical Field

The invention relates to a method for adding a moving picture on top of a larger moving picture. The method is applicable to cases in which the picture signals are compressed digital signals. The invention also relates to an arrangement for adding a moving picture on top of a larger moving picture.

2. Discussion of Related Art

The picture-in-picture (PIP) feature is a widely used technique at the transmitting end when making a television program, for example. Within the main picture a considerably smaller picture is temporarily inset which displays, say, a simultaneous event that is likely to interest the viewer. The addition of a secondary picture to the main picture may also occur at the receiving end, controlled by the user of the receiver. One or more smaller pictures may e.g. display programs running on other channels while the main picture is being viewed without interruption. The present invention relates particularly to the use of the PIP feature at the receiving end.

When compressing a digitized video signal it is customary to divide an individual picture frame into blocks which typically comprise 8×8 picture elements, or pixels. A square portion of a frame, comprised of four blocks, is called a macro block. Compression, i.e. reduction of the number of bits, is realized using intra-frame coding and inter-frame coding. The former includes e.g. predictive coding utilizing positional redundancy or the use of discrete cosine transform (DCT) concentrating signal energy of a picture block. The numbers produced by the transform are quantized in a manner that reduces the quantity of bits and ordered in a sequence where the occurrence of strings of consecutive zeroes is statistically high. These strings of zeroes are represented by a number indicating the quantity of the zeroes (this is called run length coding, RLC). Other numbers are encoded such that a frequently occurring number is represented by fewer bits than a number that occurs less frequently (variable length coding, VLC). Inter-frame coding includes predictive inter-frame coding, motion estimation comparing the contents of macro blocks at different positions, utilizing temporal redundancy and temporal interpolation of reference frames in order to produce the code for the frames between them. By combining various coding methods it is possible to reduce the number of bits transmitted down to a hundredth part of the original without substantially compromising the quality of the picture. At the receiving end of the video signal a video decoder performs the reverse operations. On the transmission path, several video signals may travel packet switched in the same transport stream (TS) so that the receiver first has to extract an individual video signal from it.

From the prior art is known a PIP method wherein two encoded video signals are separately decoded and combined after the decoding. Prior to combining, one of the video pictures is reduced in size. This can be done by selecting e.g. every fourth block in both the horizontal and vertical dimension of the video signal or by producing by means of interpolation a new macro block from each 4×5 macro block group. At a desired location of the normal-sized picture the macro blocks are then replaced by the macro blocks of the reduced picture. In this description and in the claims such a reduced picture is called a "mini-picture". The prefix "mini" means that the inset picture does not cover the whole main picture. FIG. 1 shows in the form of functional block diagram such a system according to the prior art. The system comprises decoders 110 and 120 as well as a PIP unit 130. A video signal ES1 (so-called "elementary stream") is brought to decoder 110 and video signal ES2 to decoder 120. Signals ES1 and ES2 are encoded e.g. according to the MPEG2 (Motion Picture Experts Group) standard. Decoder 110 outputs video signal VD1 and decoder 120 video signal VD2. The PIP unit 130 comprises a scaling unit 131, selector 132 and timing unit 133. Signal VD1 is directed straight to the selector. Signal VD2 is directed to the scaling unit 13 1 the output signal VD2' of which is conducted to the selector. The output signal VDO of the selector 132 is either signal VD1 or signal VD2' depending on the status of the selection signal S output by the timing unit 133. Always when the picture-generating system enters the area intended for the mini-picture, signal S goes into a state that conducts signal VD2' to the output of selector 132. At other times, signal S in a state that conducts signal VD1 to the output of selector 132. The functional blocks shown in FIG. 1 are realized partly in software and partly in hardware.

A disadvantage of the method described above is that it requires a double decoding operation. So, when using a signal processor, a double decoding capacity is required of it, which results in considerable extra costs. Another disadvantage is that in practice, for the reason stated above, only one mini-picture may be inset in the main picture.

SUMMARY OF INVENTION

An object of the invention is to eliminate the above-described disadvantages associated with the prior art.

In accordance with a first aspect of the invention, a method for insetting a moving secondary picture in a moving main picture, in which method the signals of said pictures are in an encoded digital format and the secondary picture is scaled down by reducing the number of macro blocks included in each individual frame of the picture and the scaled-down frame is inset as a mini-picture in the frame of the main picture, is characterized in that said insetting is performed prior to the decoding of the picture signals.

In further accord with the first aspect of the invention, in order to inset the frame of the scaled down secondary picture, or mini-picture, the code of the macro blocks in a certain area of the frame of the main picture are replaced by the code of the macro blocks of the frame of the mini-picture.

Still in accord with the first aspect of the invention, the reduction of the number of macro blocks in a frame is realized by leaving a selected number of macro blocks at regular intervals both in the horizontal and in the vertical dimension.

Still further in accord with the first aspect of the invention, the reduction of the number of macro blocks in a frame is realized by compiling each new macro block from the blocks of at least two original macro blocks.

Further still in accord with the first aspect of the invention, the reduction of the number of encoded macro blocks in a frame is realized by decoding the video signal to be scaled down by including in the decoding from each block at least the number that represents the dc component of the video signal, producing one new macro block by means of interpolation from a predetermined number of macro blocks produced, and encoding the signal produced using the same coding method as that used for the signal of the main picture.

According further to the first aspect of the invention, there are at least two secondary pictures to be inset in the main picture.

According still further to the first aspect of the invention, in which the code of the main picture and the code of the secondary picture are transmitted in fixed-form packets via the same transmission path as part of a transport stream, the packets belonging to said pictures are extracted from the transport stream on the basis of identifiers in the headers of the packets and a coherent main picture code and coherent secondary picture code are generated and then combined.

According to a second aspect of the invention, an arrangement for insetting a moving secondary picture in a moving main picture, the signals of said pictures being in an encoded digital format and the arrangement comprising means for scaling down each individual frame in the secondary picture and combining them with the frame of the main picture, also comprises a decoder to decoding the combined frame code into a video signal.

Further according to the second aspect of the invention, the means for scaling down an individual frame and combining it with the frame of the main picture comprises a unit for reducing the number of the macro blocks in a frame, a selector for picture signals, and a timing unit for placing the mini-picture at a certain location in the main picture.

In still further accord with the second aspect of the invention, the arrangement also comprises means for extracting the encoded signal of the main picture from the transport stream comprised of data packets, and for extracting the encoded signal of the secondary picture from said transport stream.

According to a third aspect of the invention, a receiver comprises a combiner responsive to at least two video signals for providing an output signal, and a decoder, responsive to said output signal, for providing a decoded output signal for simultaneously displaying at least two pictures corresponding to said at least two video signals.

The main idea of the invention is that the video signals are combined prior to the decoding. The encoded macro blocks of the area of the main picture intended for the mini-picture are replaced by macro blocks from another picture. These are obtained e.g. by taking macro blocks at regular intervals in such a manner that their total number equals the number of macro blocks that corresponds to the mini-picture area. A single mini-picture macro block may also be produced by assembling it from selected blocks of several original macro blocks or by interpolating a plurality of original macro blocks into a single macro block. The combined signal is then decoded.

An advantage of the invention is that a receiver only needs one decoder. In video processing, decoding is the part that requires the most computing. Another advantage of the invention is that several mini-pictures can be inset in the main picture with only minimum added computation. A further advantage of the invention is that the decoder is detached from the rest of the receiver so that the capacity of the transmission system between the decoder and receiver may be dimensioned according to the band of one channel only. Yet another advantage of the invention is that if the video signals to be combined are brought to the receiver in the same transport stream, only one complete demultiplexer is required which extracts from the transport stream the packets relating to all auxiliary activities as well.

BRIEF DESCRIPTION OF THE DRAWING

The invention is below described in detail. Reference will be made to the accompanying drawing in which FIG. 4a is a flow diagram showing an example of the operation of the scaling unit of FIG. 2, FIG. 4b shows the area of a mini-picture, FIG. 4c is a flow diagram showing an example of the operation of the timing unit of FIG. 2.

DETAILED DESCRIPTION OF PREFERRED EMBODIMENTS

Figure 1:
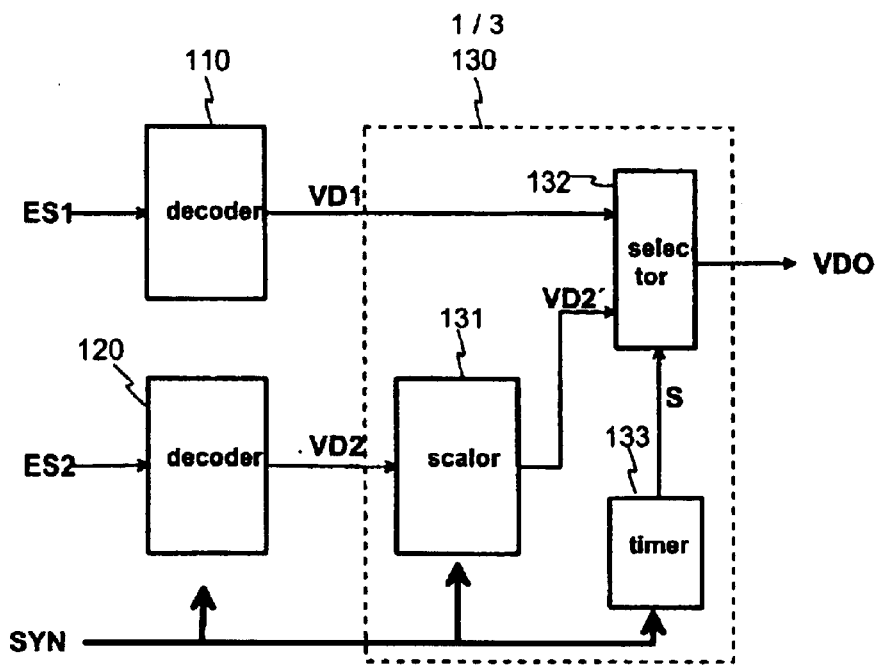
FIG. 1 shows a block diagram illustrating the principle of an arrangement according to the prior art.

FIG. 1 was already discussed in conjunction with the description of the prior art.

Figure 2:
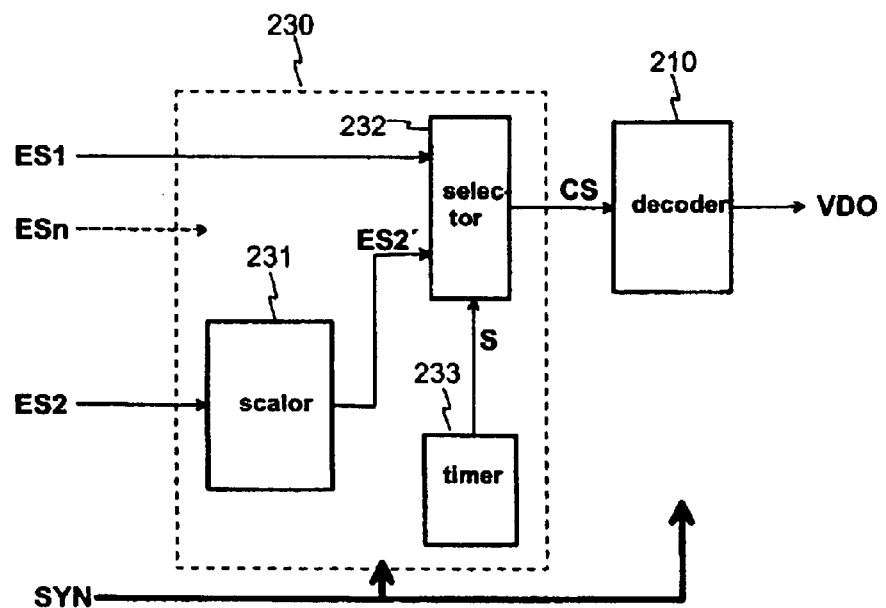
FIG. 2 shows a block diagram illustrating the principle of the arrangement according to the invention.

FIG. 2 shows in the form of functional block diagram a PIP implementation according to the invention. It comprises a PIP unit 230 and decoder 210. The PIP unit comprises a scaling unit 231, selector 232 and timing unit 233. Video signals ES1 and ES2 comprised of codes of horizontally adjacent macro blocks of a picture are brought to the system. The PIP unit 230 can be viewed as a combiner of the signals ES1, ES2. As can be seen in FIG. 2, it is responsive to the signals ES1, ES2 for providing an output signal CS to the decoder 210. Signal ES1 is conducted direct to the selector 232. Signal ES2 is conducted to the scaling unit 231 in which the picture is reduced using a known method. The output signal ES2' of the scaling unit is conducted to the selector 232. The output signal CS of the selector is either signal ES1 or signal ES2', depending on the status of the selection signal S output by the timing unit 233. Always when signal ES1 contains the code of a macro block meant for the area intended originally for the mini-picture on the screen, signal S is in state that directs signal ES2' to the output of selector 232. At other times signal S is in state that directs signal ES1 to the output of selector 232. Signal S is generated for the video signals ES1 and ES2 from temporally bound synchronization signals SYN, which are used to synchronize the operation of other units, too. Signal CS is conducted to decoder 210 which outputs a complete digital video signal VDO. Compared to the structure of FIG. 1 this structure has one decoder less, which means an almost fifty percent drop in the need for computing capacity since decoding requires much more computation than the PIP function. Applying the principle according to FIG. 2 it is possible to inset several mini-pictures in the main picture. For each mini-picture it is needed a separate scaling unit in block 230 and extensions to selector 232 and timing unit 233. One common decoder is still enough, which emphasizes the advantage over the prior art.

Figure 3:
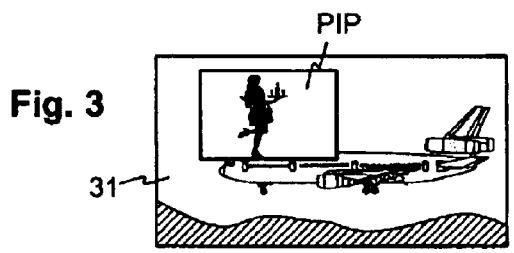
FIG. 3 shows an example of a PIP image on a screen.

FIG. 3 shows an example of an image produced by signal VDO of FIG. 1 or 2. It has a main picture 31 and an inset mini-picture PIP.

FIG. 4a shows in the form of a flow diagram an example of the operation of the scaling unit 231. A complete frame comprises C macro blocks, or macros, horizontally and R macros vertically. In the example, every $I^{th}$ macro is selected both horizontally and vertically in the frame of the picture to be reduced, the selected macros constituting signal ES2' of FIG. 2. In step 401 program reception is started. In step 402, the processing of an individual frame is started. In step 403, the values of variables r, i, c and j needed in the processing are initialized. Variable r is the number of a macro row in the complete picture, and variable c is the number of a macro column in the complete frame. Variable i is a row number, counting from the row that was last used to select macros for a mini-picture. Variable j is a column number, counting from the column that was last used to select a macro for a mini-picture. In step 404, row numbers r and i are incremented. In step 405 it is checked whether the last row of the frame was already processed. If so, the processing of the next frame is begun (step 402). If the frame is unfinished, it is checked according to step 406 whether the row being processed is a row on which macros are to be selected. If not, the column number c is incremented, step 407. In step 408 it is checked whether the macro row has come to an end. If not, the process moves on to the next macro on the row, step 409, and repeats steps 407 and 408. If the macro row has come to an end, the column number c is reset in step 410 and the process continues at step 404. If the row is a row on which macros are to be selected, the row number i is reset (step 411) and column numbers c and j are incremented (step 412). In step 413 it is checked whether the macro row has come to an end. If not, the process moves on to the next macro, step 414. In step 415 it is checked whether the column processed is a column on which macros are to be selected. If not, the process continues at step 412. If it is, the macro is saved according to step 416. At the same time column number j is reset. The process then continues at step 412.

FIG. 4b shows the area of a mini-picture. It comprises vertically R' macro block areas and horizontally C' macro block areas. Corresponding to the markings of FIG. 4a, the number of rows R' equals the ratio R/I rounded off to the nearest smaller integer, and the number of columns C' equals the ratio C/I rounded off to the nearest smaller integer. The mini-picture starts vertically from row r1 of the complete frame and horizontally from column c1 of the complete frame.

FIG. 4c shows in the form of flow diagram an example of the operation of the timing unit 233. A logic element or program corresponding to the diagram has at its disposal the values of variables r and c produced by the operation according to FIG. 4a. In step 421 the value of the row variable r and the value of the column variable c are read. In step 422 it is checked whether the current position in the complete frame is on a row that belongs to the mini-picture area. If not, selection signal S is set to zero (step 424), which state corresponds in FIG. 2 to the selection of signal ES1 by selector 232. If the current row falls within the mini-picture area, it is checked according to step 423 whether the current position in the complete frame is in a column that belongs to the mini-picture area. If not, the process moves on to step 424. If the current column falls within the mini-picture area, selection signal S is set to one (step 425), which state corresponds in FIG. 2 to the selection of signal ES2' by selector 232. The setting of signal S is realized in a synchronized manner between two consecutive macro block times. After the setting, the values of variables r and c are read again. Operation corresponding to FIG. 4c may also be realized such that the comparison corresponding to step 422 is made after the value of variable r has been incremented, and the comparison corresponding to step 423 is made after the value of variable c has been incremented.

In the operation according to FIGS. 4a, 4b and 4c the position of the mini-picture to be inset in the main picture is determined by means of parameters r1, c1. The size of the mini-picture is determined by parameter I. The width-to-height ratio of the mini-picture is thus the same as that of the main picture. The ratio can be made freely selectable if an additional parameter is introduced in the program, determining how many columns or rows of the mini-picture frame produced as described above are included in the final mini-picture.

Figure 5:
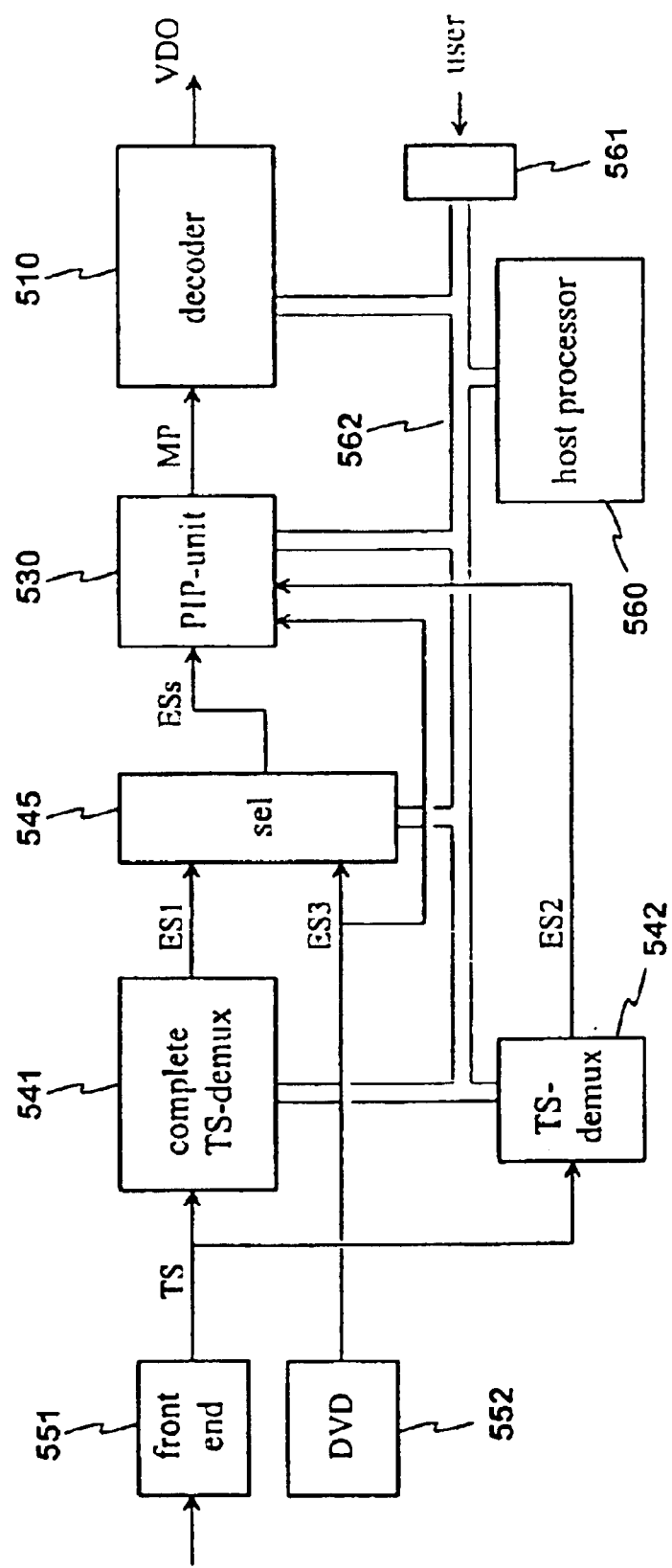
FIG. 5 shows in the form of block diagram an example of a system applying the invention.

FIG. 5 shows an example of a system in which pictures are combined in accordance with the invention. The system comprises a front end 551 which receives a radio-frequency signal and outputs a baseband digital transport stream signal TS. Signal TS comprises consecutive packets comprised of a header and transport data proper. The header comprises, among other things, the packet identity data (PID) or identifiers. The transport stream may include packets containing the code of several different video signals and, in addition, packets associated with various auxiliary activities of the receiver. Signal TS is conducted to a TS multiplexer 541. This is a complete demultiplexer, which means it monitors a relatively large amount of PID numbers, and extracts from the transport stream the respective packets. The demultiplexer 541 sends the code ES1 of the selected video signal to a selector 545 and the data contents of the other extracted packets to a host processor 560 in the system. Signal TS is also conducted to a second TS demultiplexer 542. This is a relatively simple demultiplexer which extracts from the transport stream only the packets associated with a particular video signal. Of these the demultiplexer 542 produces video signal ES2 and,feeds it to a PIP unit 530, to a scaling unit in it. In this example, video signal ES3 from a video disc drive 552 is also brought to selector 545. Signal ES3 is encoded in the same manner as signals ES1 and ES2. Selector 545 outputs the main picture signal ESs, which is either ES1 or ES3, depending on a control issued by the host processor 560. Signal ESs is conducted to the PIP unit 530, which corresponds to the PIP unit 230 in FIG. 2. Signal ES3 is also conducted direct to the PIP unit 530, to a scaling unit in it. Unit 530 reduces the number of macro blocks of signal ES2, signal ES3 or both, depending on a control issued by the processor 560. Furthermore, unit 530 substitutes macro blocks of the scaled-down pictures for a certain portion of the macro blocks of signal ESs corresponding to the main picture. Thus in this example it is possible to inset one or two pictures in the main picture. The output signal MP of unit 530 is conducted to a common decoder 510 which outputs a complete digital video signal VDO. It is used to generate the analog or digital signals controlling the display. The system also comprises a unit 561 to receive selection and control data from the user. The host processor 560 is connected with the other units via a bus 562.

In the foregoing embodiments according to the invention were described. The invention is not limited to these embodiments. For example, in the scaling of the picture inset in the main picture it is possible to use interpolation also in the case of a common decoder. In that case, the picture to be reduced is decoded in a simple manner e.g. by selecting from the numbers produced by the DCT only the numbers representing the dc components of each block. Scaling is then performed using interpolation, followed by new encoding prior to the combination of the pictures. The extraction of different video signals from the transport stream may also be realized using a single demultiplexer instead of two or more. The invention may be applied in different ways within the scope defined by the appended claims.

What is claimed is:

1. A method for insetting a moving secondary picture in a moving main picture, in which method the signals of said pictures are encoded in frames in a digital format, the method comprising the steps of:

scaling down the secondary picture by reducing a number of macro blocks included in each individual frame of the secondary picture and insetting the scaled-down frame as a mini-picture in the frame of the main picture, wherein said insetting is performed prior to decoding said signals of said pictures.

2. The method according to claim 1, wherein in the step of insetting the scaled-down frame, a code of the macro blocks in a certain area of the frame of the main picture is replaced by a code of the macro blocks of the frame of the mini-picture.

3. The method according to claim 1, wherein the step of scaling down the secondary picture is realized by leaving a selected number of macro blocks at regular intervals both in a horizontal and in a vertical dimension.

4. The method according to claim 1, wherein the step of scaling down the secondary picture is realized by compiling a new macro block from blocks of at least two original macro blocks.

5. The method according to claim 1, wherein said reduction of the number of encoded macro blocks in a frame is realized by decoding the video signal by including in the decoding from each block at least a number that represents a dc component of the video signal, producing one new macro block by interpolating from a predetermined number of macro blocks produced, and encoding a signal produced by said step of producing using a same coding method that is used for the signal of the main picture.

6. The method according to claim 1, wherein in the steps of scaling down and insetting, there are at least two secondary pictures for said scaling down and said insetting in the main picture.

7. The method according to claim 1, in which in order to perform the steps of scaling down and insetting, code of the main picture and code of the secondary picture are transmitted in packets via a same transmission path as part of a transport stream, wherein the packets belonging to said pictures are extracted from the transport stream according to identifiers in headers of the packets, and a main picture code and secondary picture code are generated and then combined.

8. An arrangement for insetting a moving secondary picture in a moving main picture, wherein signals of said pictures are in an encoded digital format, the arrangement comprising:

means (230) for scaling down an individual frame in the secondary picture by reducing a number of macro blocks included in each individual frame of the secondary picture and combining a resulting scaled-down frame with a frame of the main picture for providing combined frame code, and a decoder (210) for decoding the combined frame code into a video signal.

9. The arrangement according to claim 8, wherein the means for scaling down an individual frame and combining it with the frame of the main picture comprises a unit (231) for reducing a number of the macro blocks in a frame, a selector (232) for picture signals, and a timing unit (233) for placing the scaled-down frame as a mini-picture at a certain location in the main picture.

10. The arrangement according to claim 8, further comprising means (541, 542) for extracting the signal of the main picture from a transport stream comprising data packets, and for extracting the signal of the secondary picture from said transport steam.

11. A receiver comprising:

a combiner (230) for insetting a moving secondary picture in a moving main picture using scaling down of the secondary picture by reducing a number of macro blocks included in each individual frame of the secondary picture, responsive to at least two signals in a digital format for providing an output signal (CS), wherein said at least two signals represent the main picture and the at least one secondary picture, respectively, and a decoder, responsive to said output signal, for providing a decoded output signal for simultaneously displaying at least two pictures corresponding to said at least two video signals.

12. The method according to claim 2, in which in order to perform the steps of scaling down and insetting, the code of the main picture and the code of the secondary picture are transmitted in fixed-form packets via a same transmission path as part of a transport stream, wherein the packets are extracted from the transport stream according to identifiers in headers of the packets, for generating and then combining a coherent main picture code and a coherent secondary picture code.

13. The arrangement according to claim 9, wherein it also comprises means (541, 542) for extracting the encoded signal of the main picture from the transport stream comprised of data packets, and for extracting the encoded signal of the secondary picture from said transport stream.

* * * * *

UNITED STATES PATENT AND TRADEMARK OFFICE
CERTIFICATE OF CORRECTION

PATENT NO. : 6,724,434 B1
DATED : April 20, 2004
INVENTOR(S) : J. Aaltonen

It is certified that error appears in the above-identified patent and that said Letters Patent is hereby corrected as shown below:

Column 8,
Line 19, please change "steam" to -- stream --.

Signed and Sealed this

Sixth Day of July, 2004

JON W. DUDAS
*Acting Director of the United States Patent and Trademark Office*